United States Patent Office 3,359,278
Patented Dec. 19, 1967

3,359,278
N-SUBSTITUTED-2,4,6-TRIIODOANILIC ACIDS AND SALTS THEREOF
Vernon H. Wallingford, Ferguson, Mo., assignor to Mallinckrodt Chemical Works, St. Louis, Mo., a corporation of Missouri
No Drawing. Filed May 24, 1963, Ser. No. 282,862
5 Claims. (Cl. 260—326.5)

This invention relates to halogenated compounds and more particularly to certain novel iodonated anilic acids.

Briefly the present invention is directed to certain N-substituted-2,4,6-triiodoanilic acids and to certain salts thereof. The invention also includes methods of preparing the novel compounds of the class described.

Among the objects of the invention may be mentioned the provision of new halogenated compounds; the provision of new iodinated anilic acids; the provision of new N-substituted-2,4,6-triiodoanilic acids; the provision of compounds of the type indicated which are useful as roentgenographic contrast agents; and the provision of methods of preparing the novel compounds of the class described. Other objects and features will be in part apparent and in part pointed out hereinafter.

The invention accordingly comprises the products and methods hereinafter described, the scope of the invention being indicated in the following claims.

The present invention is directed to the novel compounds represented by the formula:

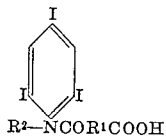

where $R^1$ is a divalent lower aliphatic radical and $R^2$ is hydrogen or a lower monovalent aliphatic radical, and the salts thereof with pharmaceutically acceptable cations.

In the above formula, $R^1$ and $R^2$ may be straight or branched chain, saturated or unsaturated. The term "pharmaceutically acceptable cations" contemplates the inorganic cations, such as sodium and calcium, and organic cations, such as N-methylglucamine and diethanolamine, which are known to be acceptable for use in X-ray contrast media.

The novel N-alkyl compounds of the present invention are useful as roentgenographic contrast agents, especially in oral cholecystography. The unalkylated precursors are, of course, useful intermediates.

A general method of preparation is outlined below:

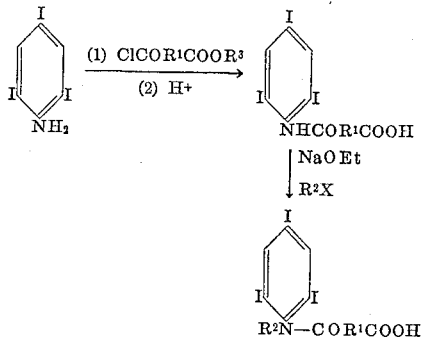

In the above sequence, $R^1$ and $R^2$ have the meanings previously set forth, $R^3$ represents a lower alkyl radical and X represents a halogen.

The condensation of triiodoaniline with a monoacyl halide of a dibasic acid monoester and subsequent hydrolysis of the resulting anilic acid ester may be carried out by methods generally similar to those disclosed in U.S. Patent 2,776,241, dated Jan. 1, 1957. The subsequent alkylation of the anilic acid may be carried out by methods generally similar to those described in the copending coassigned application of V. H. Wallingford and R. D. Rands, Jr., Ser. No. 75,916, filed Dec. 15, 1960.

In the case of certain special circumstances alternative methods of synthesis have been found useful. For example, succinanilic acid derivatives may be prepared by fusing triiodoaniline and succinic anhydride to form N-(2,4,6-triiodophenyl)succinimide, which may then be hydrolyzed to the corresponding succinanilic acid and alkylated as indicated above. The reactions are outlined below:

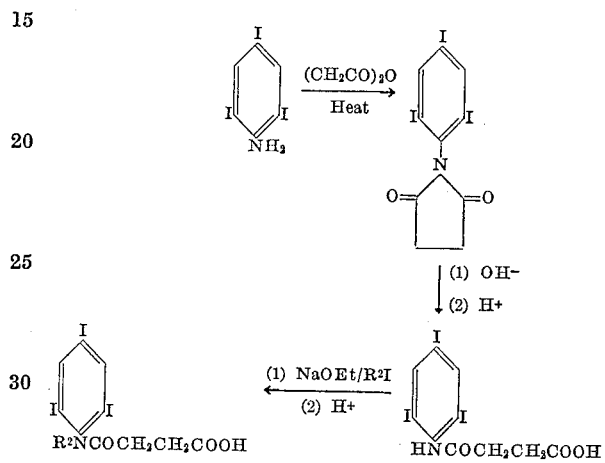

The following examples illustrate the invention.

EXAMPLE 1

*N-(2,4,6-triiodophenyl)succinimide*

Crude 2,4,6-triiodoaniline (20 g.) was heated with succinic anhydride (60 g.), at 190–200° C. for one hour. The mass first melted, and after 15–20 minutes the mixture thickened as N-(2,4,6-triiodolhenyl)succinimide began to separate from the melt. The reaction mixture was cooled and used in the following step.

EXAMPLE 2

*2,4,6-triiodosuccinanilic acid*

The semisolid reaction mixture from Example 1 was macerated with hot water and made strongly alkaline with sodium hydroxide. The alkali insoluble material was separated, stirred with warm alcoholic sodium hydroxide (100 ml. of ethanol containing 5 ml. of 50% sodium hydroxide solution) and filtered. The alcoholic sodium hydroxide treatment was repeated and the two filtrates were combined, neutralized with acetic acid and evaporated nearly to dryness to remove the ethanol. The residue was dissolved in hot water (1200 ml.) with the aid of ammonium hydroxide. The resulting solution was filtered and the product precipitated by the addition of acetic acid. The precipitation mixture was digested at 80–90° C. and filtered hot. The crude, partly crystalline 2,4,6-triiodosuccinanilic acid was dried at 650 C. Yield, 8.0 g. M.P. 248.8–249.8° C. with decomposition. This crude material was found suitable as an intermediate for further synthesis.

Portions were purified by digestion with hot acetic acid and by crystallization from acetic acid (1 g. in 100 ml.). M.P. 249.4–250.4° C. Iodine (I): calculated, 66.7%; found 66.2%. The indicated structure was confirmed by infrared examination.

EXAMPLE 3

2,4,6-triiodosuccinanilic acid

Sublimed 2,4,6-triiodoaniline (4.7 g., 0.01 mole) was heated with dimethylformamide (10 ml.) and beta-carbomethoxypropionyl chloride (2.5 g., 0.016 mole) at about 80° C. for one-half hour. The solid dissolved, but within a few minutes the reaction medium was filled with a crystalline material of a different type. The mixture was diluted to a volume of 50 ml., and the crude 2,4,6-triiodosuccinanilic acid was filtered off and dried at 110° C. Yield, 5.1 g.

A portion of the crude product (4.8 g.) was stirred with a mixture of dimethylformamide (20 ml.) and water (5 ml.), sodium hydroxide (1 ml. of 50% solution) was gradually added, and the mixture was warmed to 45–50° C. for four minutes, diluted to 150 ml. with water and filtered. When the filtrate was acidified with acetic acid an amorphous precipitate formed. When this was filtered off and heated to boiling with acetic acid (30 ml.) the product became entirely crystalline and was filtered off, washed and dried. Yield of 2,4,6-triiodosuccinanilic acid, 3.0 g. M.P., 250.3–250.8° C., with decomposition. This product was proved to be identical to the product described in Example 1 by means of the melting point of a mixture of the two products.

EXAMPLE 4

N-methyl-2,4,6-triiodosuccinanilic acid 2,4,6-triiodosuccinanilic acid (57.1 g., 0.1 mole) was added to a solution of sodium ethylate prepared from sodium (4.8 g., 0.209 mole) and anhydrous ethanol (180 ml.). The triiodosuccinanilic acid dissolved when the mixture was stirred and heated near reflux temperature, after which a new solid formed in the reaction mixture. The mixture was cooled to 50° C. and methyl iodide (25.0 g.) was added. The solid soon congealed to a taffy-like mass which resisted mechanical stirring. Ethanol (100 ml.) was added and the mixture was heated with occasional hand stirring for one hour, at the end of which solution was practically complete. The volume was reduced to about 100 ml. by means of evaporation, and 50% sodium hydroxide solution (10 ml.) was added. A solid mass of crystals resulted. Ethanol (100 ml.) was added and the mixture was stirred ten minutes at 60–70° C. The excess sodium hydroxide was neutralized with acetic acid, and most of the alcohol was evaporated. The residue was dissolved in water (800 ml.), and the solution was treated with decolorizing carbon and filtered. The filtrate was acidified with hydrochloric acid, causing the formation of an oily precipitate, which became crystalline after the precipitation mixture was heated at 75–85° C. for a time. The mixture was cooled and filtered and the product dried at 110° C. Yield, 49.8 g. M.P., 158.0–161.4° C.

The crude product was dissolved in ethanol (225 ml.) and the solution treated with decolorizing carbon and filtered. The filtrate was diluted with water (225 ml.) and the precipitated N-methyl-2,4,6-triiodosuccinanilic acid filtered off and dried at 65° C. Yield, 42.1 g. M.P., 164.1–165.5° C. Neutral equivalent: calculated, 584.7; found, 585.0. Iodine (I): calculated, 65.2%; found, 64.65%. The indicated structure was confirmed by infrared examination.

EXAMPLE 5

N-methyl-2,4,6-triiodosuccinanilic acid was converted to its N-methylglucamine salt by known methods.

EXAMPLE 6

N-butyl-2,4,6-triiodosuccinanilic acid 2,4,6-triiodosuccinanilic acid (57.1 g., 0.1 mole) was stirred twenty minutes with a hot solution of sodium ethylate prepared from sodium (4.8 g., 0.209 mole) and anhydrous ethanol (280 ml.). An easily stirrable slurry of crystals of the disodium compound formed. n-Butyl iodide (35.0 g.) was added, and the mixture was stirred under reflux for three hours. After about half of the alcohol had been evaporated, sodium hydroxide (9 ml. of 50% solution) and water (200 ml.) were added, with the resulting formation of a clear solution.

The solution was diluted to 1200 ml., decolorizing carbon was added and filtration was attempted with only partial success, since some carbon passed through the filter. The solution was acidified with acetic acid and the precipitated solid filtered off and redissolved in 300 ml. of ethanol. The ethanol solution was filtered free of carbon, concentrated to 200 ml. and allowed to crystallize.

The crystals were filtered off, redissolved in warm ethanol (250 ml.), and 50% sodium hydroxide solution was added until the mixture was alkaline (pH 10). Continued stirring at room temperature caused the sodium salt, which was at first gummy, to crystallize. The salt was filtered off, washed with alcohol, dissolved in water (200 ml.), and the solution acidified with excess acetic acid. The product, oily at first crystallized during digestion of the precipitation mixture on the steam bath. The crystalline N-butyl-2,4,6-triiodosuccinanilic acid was filtered off and dried at 110° C. Yield, 37.2 g. M.P., 179.2–182.3° C. Neutral equivalent: calculated, 626.7; found, 622.0. Iodine (I): calculated 60.75%; found, 60.49%. The infrared spectrum was consistent with the indicated structure.

EXAMPLE 7

N-butyl-2,4,6-triiodosuccinanilic acid was converted to its N-methylglucamine salt by known methods.

EXAMPLE 8

N-allyl-2,4,6-triiodosuccinanilic acid 2,4,6-triiodosuccinanilic acid (63.4 g., 0.111 mole) was stirred fifteen minutes in a refluxing solution of sodium ethylate prepared from sodium (5.3 g., 0.23 mole) and anhydrous ethanol (275 ml.). Allyl chloride (30.0 g.) was added to the resulting slurry of crystals of the disodium compound, and the mixture was stirred at reflux temperature for five and one-half hours. At the end of the first hour mechanical stirring was stopped because the reaction mixture had congealed to a gummy mass. Within fifteen minutes it became stirrable again and finally only a small amount of undissolved gray solid remained in the neutral liquid. After about 100 ml. of alcohol had been evaporated from the reaction mixture, the residue was found to be entirely soluble in water, indicating that little if any ester had been formed. The solution was diluted with water to a volume of 1 liter, treated with decolorizing carbon and filtered. The filtrate was heated and acidified with hydrochloric acid and the resulting mixture digested until the precipitate was crystalline. The crude product was filtered off and dissolved as the sodium salt in hot ethanol (275 ml. of ethanol with sufficient 50% sodium hydroxide solution to increase the pH to 8) and the solution was treated with decolorizing carbon and filtered. The filtrate was diluted with water to a volume of 1 liter and the hot solution was acidified with hydrochloric acid. The mixture was cooled and the crystalline N-allyl-2,4,6-triiodosuccinanilic acid filtered off and dried at 70° C. Yield, 56.2 g. Neutral equivalent: calculated, 610.7; found, 607.0. Iodine (I): calculated, 62.3%; found, 62.8%. The infrared spectrum was consistent with the indicated structure.

EXAMPLE 9

N-allyl-2,4,6-triiodosuccinanilic acid was converted to its N-methylglucamine salt by known methods.

It is to be understood that salts of the compounds of the invention with pharmaceutically acceptable cations other than N-methylglucamine may be prepared by conventional methods known to the art.

Intravenous $LD_{50}$ data for the N-methylglucamine salts of Examples 5, 7 and 9 were determined by intravenous administration of solutions thereof to laboratory mice. The results are shown in Table 1.

TABLE 1.—ACUTE TOXICITY OF N-ALKYL-2,4,6-TRIIODO-SUCCINANILIC ACIDS

| Example | N-Alkyl Group | Intravenous $LD_{50}$ of NMG Salt in Mice (mg./kg.) |
|---|---|---|
| 5 | $CH_3-$ | 447 |
| 7 | $CH_3CH_2CH_2CH_2-$ | 237 |
| 9 | $CH_2=CH-CH_2-$ | 310 |

The N-methylglucamine salts of Examples 5, 7 and 9 were administered orally to cats in equivalent doses representing 59.3 mg. of iodine per kilogram of body weight. X-ray visualization of the gall bladder was achieved with all three compounds, the opacity decreasing in the following order of N-substitution: butyl, methyl, allyl.

In view of the above it will be seen that the several objects of the invention are achieved and other advantageous results obtained.

As various changes could be made in the above products and methods without departing from the scope of the invention, it is intended that all matter contained in the above description shall be interpreted as illustrative and not in a limiting sense.

What is claimed is:

1. 2,4,6-triiodosuccinanilic acid.
2. A compound selected from the group consisting of N-methyl-2,4,6-triiodosuccinanilic acid and salts thereof with pharmaceutically acceptable cations.
3. A compound selected from the group consisting of N-butyl-2,4,6-triiodosuccinanilic acid and salts thereof with pharmaceutically acceptable cations.
4. A compound selected from the group consisting of N-allyl-2,4,6-triiodosuccinanilic acid and salts thereof with pharmaceutically acceptable cations.
5. N-(2,4,6-triiodophenyl)succinimide.

References Cited

UNITED STATES PATENTS 3,238,217   3/1966   Grogan et al. _____ 260—326
3,178,473   4/1965   Holtermann et al. ____ 260—518

OTHER REFERENCES

Koller: Ber. Deut. Chem. 37, 1598–1599 (1904).

Chemical Abstracts 58, 4474–4475 (1963), citing Belgian Patent No. 614,519, Mar. 15, 1962.

Brewster: Organic Chemistry, June 1954, Prentice-Hall, Inc., New York.

Fieser et al.: Organic Chemistry, 1958, D. C. Heath and Company, Boston.

LORRAINE A. WEINBERGER, *Primary Examiner.*

D. D. HORWITZ, RICHARD JACKSON, *Examiners.*

L. A. THAXTON, *Assistant Examiner.*